United States Patent [19]
Miller

[11] Patent Number: 5,853,321
[45] Date of Patent: Dec. 29, 1998

[54] FISH PROCESSING MACHINE HAVING REFRIGERATED WHEELS

[76] Inventor: Leonard P. Miller, 40535 Waterman Rd., Homer, Ak. 99603

[21] Appl. No.: 943,042

[22] Filed: Oct. 1, 1997

[51] Int. Cl.$^6$ ................................................. A22C 25/16
[52] U.S. Cl. .......................................... 452/161; 452/162
[58] Field of Search ................................... 452/161, 162, 452/125, 126

[56] References Cited

U.S. PATENT DOCUMENTS

| | | | |
|---|---|---|---|
| 4,628,570 | 12/1986 | Wenzel | 452/125 |
| 4,649,570 | 3/1987 | Braegier | 452/125 |
| 4,765,030 | 8/1988 | Dubowik | 452/126 |
| 5,507,690 | 4/1996 | Ride | 452/161 |

FOREIGN PATENT DOCUMENTS

| | | | |
|---|---|---|---|
| 109486 | 9/1966 | Norway | 452/125 |

*Primary Examiner*—Willis Little
*Attorney, Agent, or Firm*—Michael Tavella

[57] ABSTRACT

A fish processing machine that uses a large pair of refrigerated wheels to hold a fish for processing. The wheels rotate in a clockwise direction. A fish is introduced at the top of the wheels, where it is pressed against the refrigerated wheels. By the phenomenon of frost adhesion, the fish adheres to the wheels. The wheels are angled so that they are spaced closer at the top and farther apart at the bottom. As the wheels rotate, a pair of filleting knives cut the fillets from the carcass. As the wheels continue to rotate, the fillets are automatically separated by adhering to the refrigerated wheels. The remainder of the fish falls down between the wheels to a conveyer for disposal or further processing. As the wheels continue to turn, the fillets can be further processed before the fillets are removed from the skin and the skin is cleaned from the wheels.

20 Claims, 24 Drawing Sheets

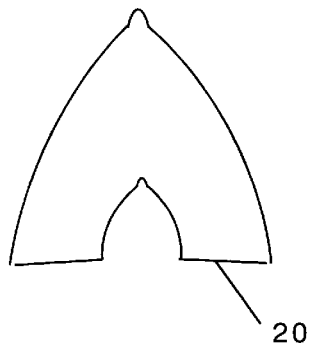
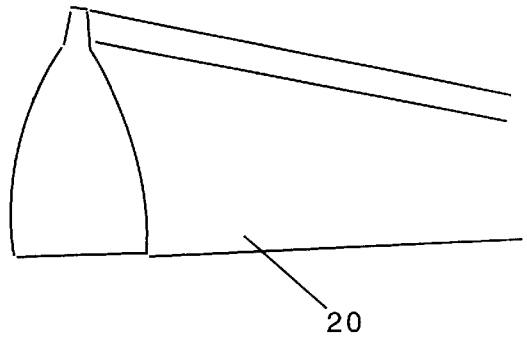
Figure 4
Figure 6
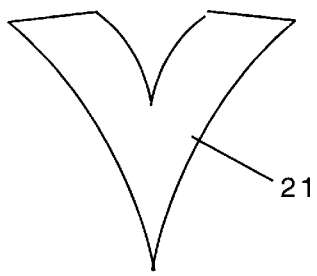
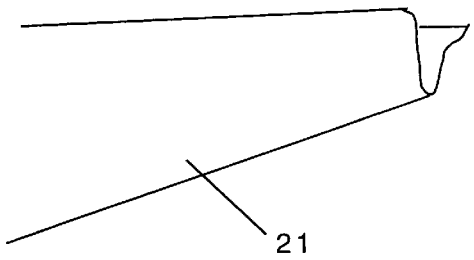
Figure 5
Figure 7

FISH PROCESSING MACHINE HAVING REFRIGERATED WHEELS

This invention relates to fish processing machines and particularly to fish processing machine having refrigerated wheels.

BACKGROUND OF THE INVENTION

Fish processing is as old as the art of fishing itself. Over the years, many devices have been developed to clean and process large quantities of fish. These machines are typically based on a conveyer system that transports a fish through a number of processing stations. Thus, the fish might first be skinned, then gutted than filleted, etc. The primary characteristic of these machines is their size. Because they are designed to move in conveyer fashion, they cover much ground. Examples of these types of machines can be found in U.S. Pat. Nos. 4,084,294, 5,299,974, and 5,492,502. In addition, many devices have been developed to perform the different processes, such as filleting knives, devices for removing the roe from the fish, and devices for removing fish skins. Some fish skinners use a large refrigerated drum to peel the skin from the fish. The skin attaches to the drums by cold adhesion. As the drum is rotated, the skin is pulled from the fish body and the skinned fish is moved to the next processing station.

The problem with all of these processing machines is, as noted above, that they require a lot of room because of their conveyer layout. Long lines of processing equipment take up valuable space and, therefore, have a higher investment cost. Moreover, the assembly line style of fish plant is not as efficient because the fish must move over large distances. The more a fish is handled and the longer it takes to process the fish, the lower the final quality of the product.

SUMMARY OF THE INVENTION

The instant invention overcomes the problems associated with long conveyer stations. It uses a large pair of refrigerated wheels to hold a fish for processing. A fish is introduced at the top of the wheels, where it is pressed against the refrigerated wheels. Moisture present on the skin of the fish creates frost adhesion with the refrigerated wheels, which makes the fish adhere to the wheels. The wheels are angled so that they are spaced closer at the top and farther apart at the bottom. In the preferred embodiment, the wheels rotate in a clockwise direction. As the wheels rotate, a pair of filleting knives cuts the fillets from the carcass. As the wheels continue to rotate, the fillets are automatically separated by adhering to the refrigerated wheels. The remainder of the fish falls down between the wheels to a conveyer for disposal or further processing. As the wheels continue to turn, the fillets can be further processed before the fillets are removed from the skin and the skin is cleaned from the wheels.

It is an object of this invention to produce a fish processing machine that uses refrigerated wheels to hold and separate the usable fillets from a carcass by the phenomenon of frost adhesion.

It is another object of this invention to produce a fish processing machine that has spacing for additional processing tools and further such that a fish is automatically moved through these various processing tools.

It is yet a further object of this invention to produce a fish processing machine that performs all or most of the various processing steps in a small area.

BRIEF DESCRIPTION OF THE DRAWINGS

FIG. 4 is a front view of the upper guide of the preferred embodiment.

FIG. 5 is a front view of the lower guide of the preferred embodiment.

FIG. 6 is a perspective view of the upper guide of the preferred embodiment.

FIG. 7 is a perspective view of the lower guide of the preferred embodiment.

DETAILED DESCRIPTION OF THE INVENTION

Figure 1:
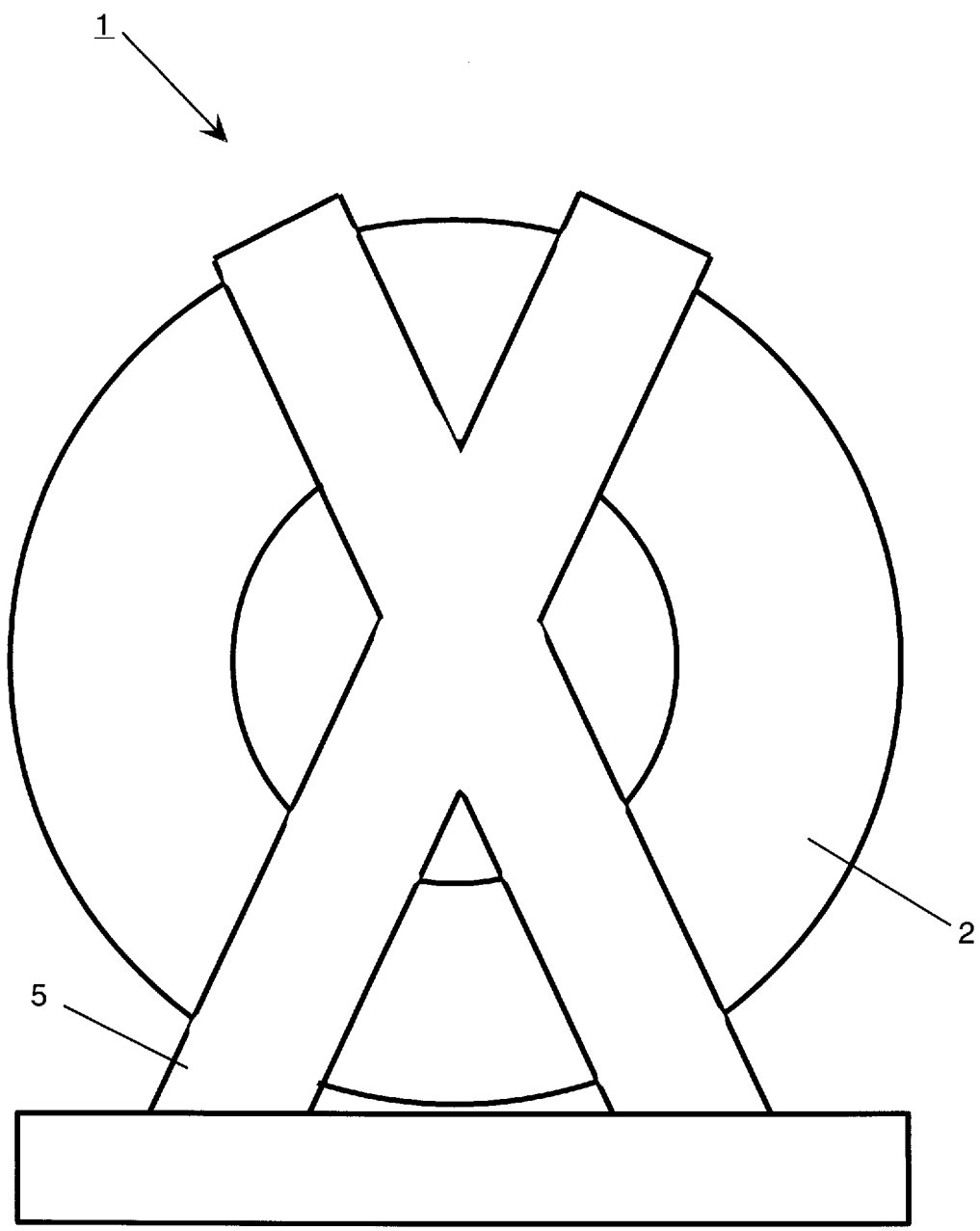
FIG. 1 is a side view of the invention.
Figure 2:
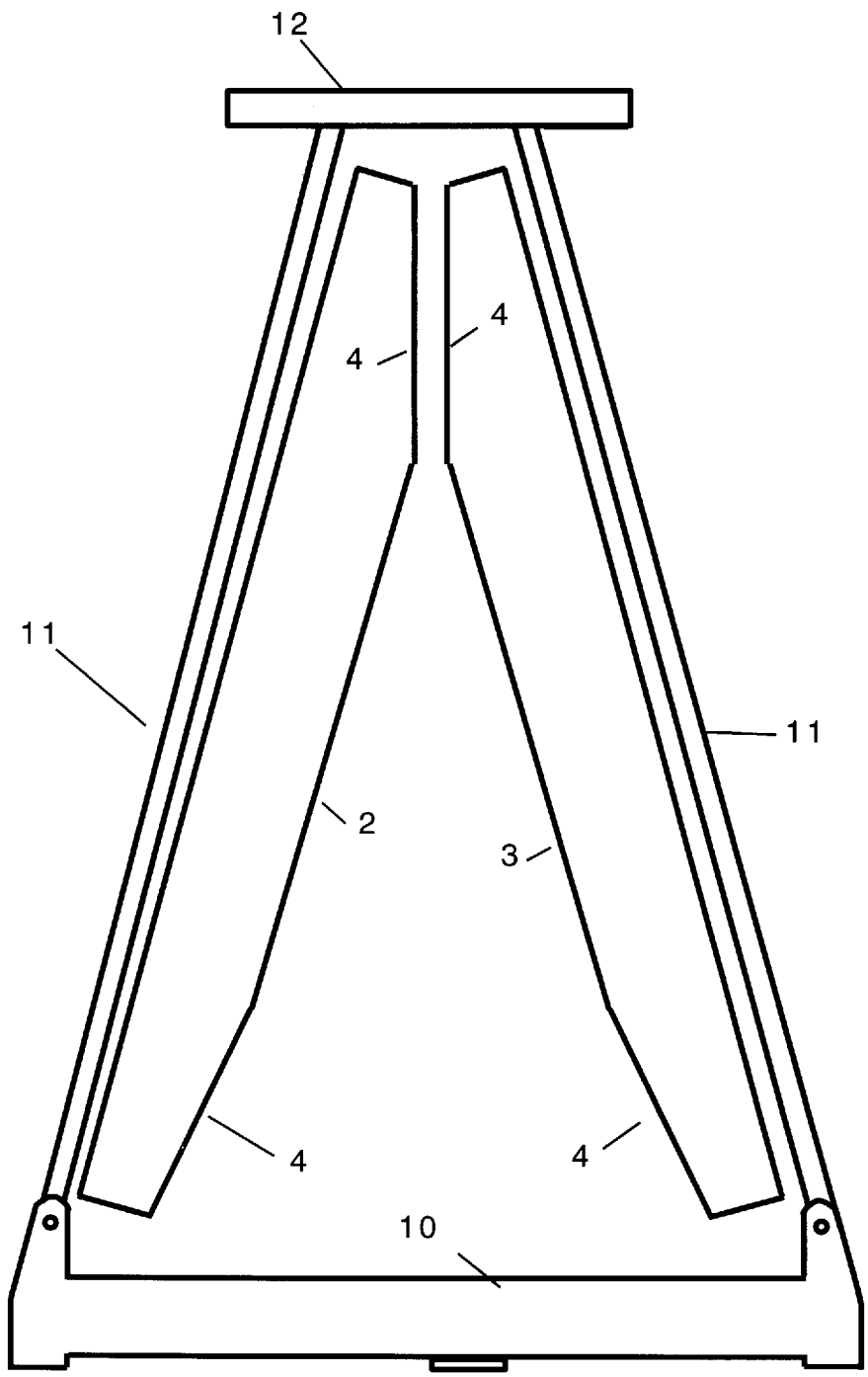
FIG. 2 is a front view of the refrigerated wheels and frame work.

Referring now to FIGS. 1 and 2, the invention 1 has two rotating wheels 2 and 3. The diameter of the wheels varies according to the size of the fish being processed. For many of the medium sized fish, such as salmon, the wheels 2 and 3 are between 5 and 6 feet in diameter. The outer foot to foot-and-a-half 4 of the wheels 2 and 3 is beveled so that when the wheels 2 and 3 are tipped on their axis points, in this illustration, the upper edges 4 are parallel, as shown in FIG. 2. The wheels 2 and 3 can be tipped in at the bottom or placed on their side, depending on the desired configuration.

The wheels 2 and 3 are mounted on an adjustable frame 5 (discussed in more detail below) so that the distance between the wheels 2 and 3 can be changed. In the preferred embodiment, the wheels 2 and 3 are made of a composite plastic material. The beveled outer portions 4 have a stainless steel machined surface (see FIG. 3). The stainless steel surface is frost susceptible and is in thermal communication with a hollow core 6. Refrigerated liquid is circulated within this hollow core 6. The refrigerated liquid cools the stainless steel machined surfaces of the beveled outer portions 4 thereby creating a refrigerated surface. When a fish 100 (either whole or headed and gutted) is fed into the top of the invention 1, the wet skin 101 of the fish 100 adheres to the refrigerated surfaces 4 on the wheels.

Figure 3:
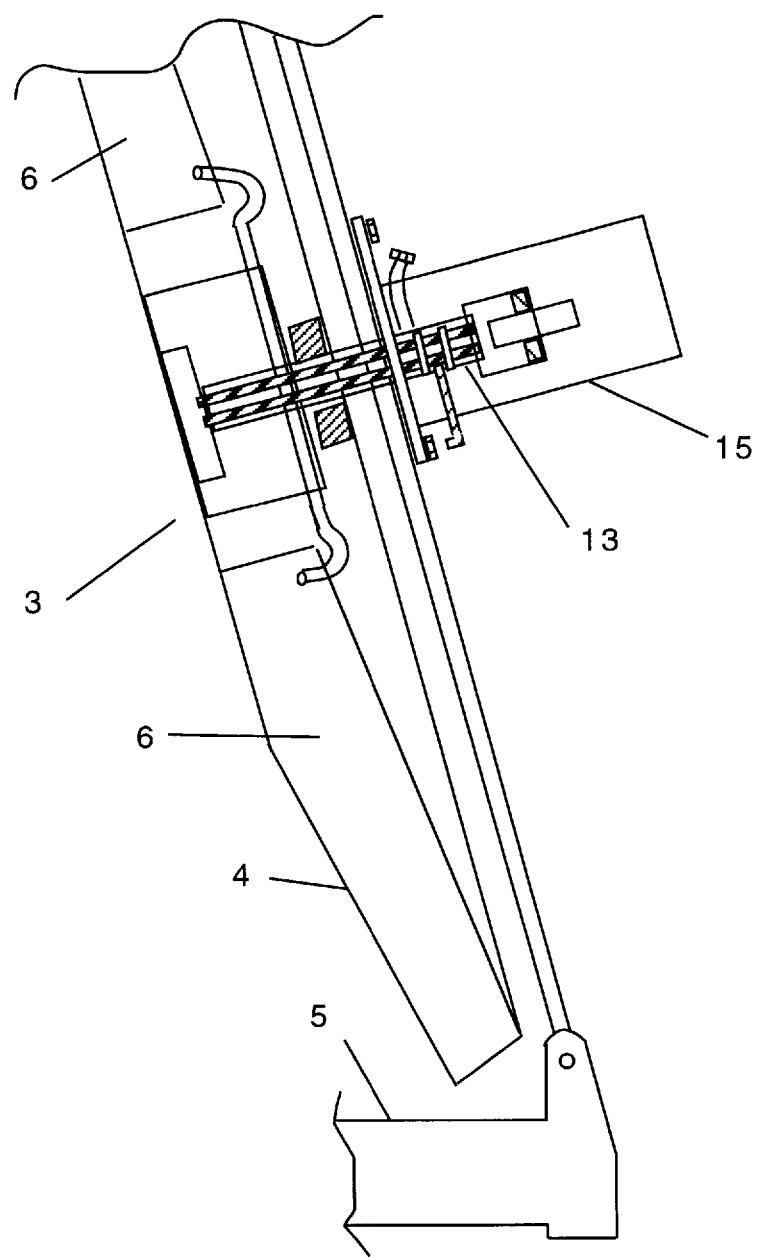
FIG. 3 is a detail view of the wheel drive mechanism and the refrigerant pumping system that transports refrigerant into the wheels.

Referring now to FIGS. 1, 2 and 3, details of the frame 5 are shown. The frame 5 has a bottom plate 10 that extends along the base of the device. A pair of crossed side braces 11 are provided on each side of the wheels 2 and 3 to secure the wheels 2 and 3 rotatably in place. A top bar 12 joins to cross braces 11 together, to provide a stable assembly. The cross braces 11 are adjustable so that different sized wheels can be used. Also, the top spacing can be adjusted to accommodate different sized fish 100.

The wheels 2 and 3 are mounted to the cross braces 11 by short axles 13. The axles are connected to a drive motor system 15. Both wheels 2 and 3 can be driven by one motor or by two separate motors. When two motors 15 are used, it is important that their speeds be as matched as possible to provide uniform turning of the wheels 2 and 3.

As the fish 100 moves into the machine 1 it is pressed somewhat as the wheels 2 and 3 move to their closest position at the top of rotation. See FIGS. 24 and 25. As the wheels 2 and 3 continue to rotate, they move apart. Filleting knives 16 and 25 (see FIGS. 8, 9 and 10) separate the meat from the bone structure, i.e., the back bone and rib cage. As the fish 100 is cut, the fillets 100a and 100b, which are stuck on the wheels 2 and 3, also move away from the center. See FIG. 26, for example. As the wheels 2 and 3 continue to rotate, the fillets 100a and 100b move down on the wheels 2 and 3 and the carcass 120 falls vertically into a carcass chute 27 for further processing.

Figure 8:
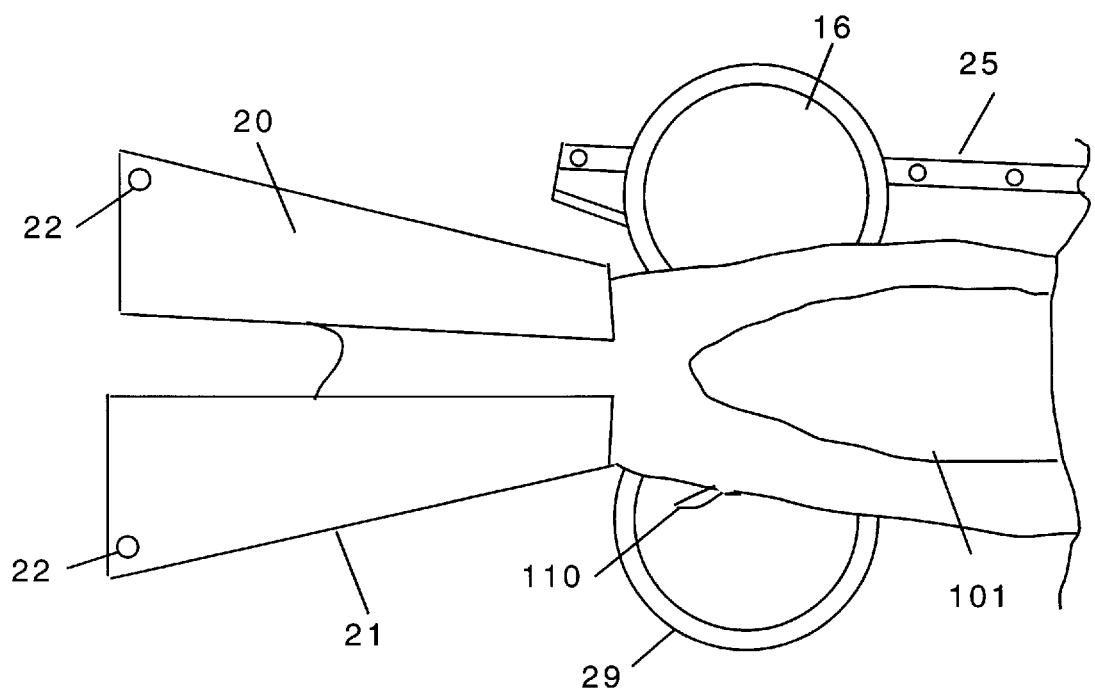
FIG. 8 is a side detail view of a fish being filleted using the system of the first embodiment.

To produce the fillets 100a and 100b, two different systems can be used. In the preferred embodiment, the fish 100 must be headed and gutted before introducing it into the device. The headed and gutted fish 100 is slid with the back up into funnel-shaped positioning guides 20 and 21. The guides 20 and 21 are shown if FIGS. 4–8. These guides 20 and 21 center the backbone in preparation for filleting. The guides 20 and 21 are divided into an upper guide 20 (FIGS. 4 and 6) and a lower guide 21 (FIGS. 5 and 7). The guides 20 and 21 are shaped differently because a headed and gutted fish has no way to support its lower extremities. Therefore, as shown in FIG. 8, the fish 100 is supported just below the rib line until the anal fin 110 enters the guides. The positioning guides 20 and 21 are spring loaded toward each other and can pivot on two pivot pins 22 (see FIG. 8) to allow the fish 100 to pass through until the fish 100 makes contact with the refrigerated wheels 2 and 3. As the fish is guided toward the wheels 2 and 3, the open gut is directed onto a rounded rib cage guide 23 (see FIG. 9) upon which the vertebrae slide. The two guides 20 and 21 are spaced somewhat apart to allow the center portion of the fish to bulge outward to ensure contact with the refrigerated wheels 2 and 3. Once contact is made, the guides 20 and 21 direct the fish into the fillet knives 16.

Figure 9:
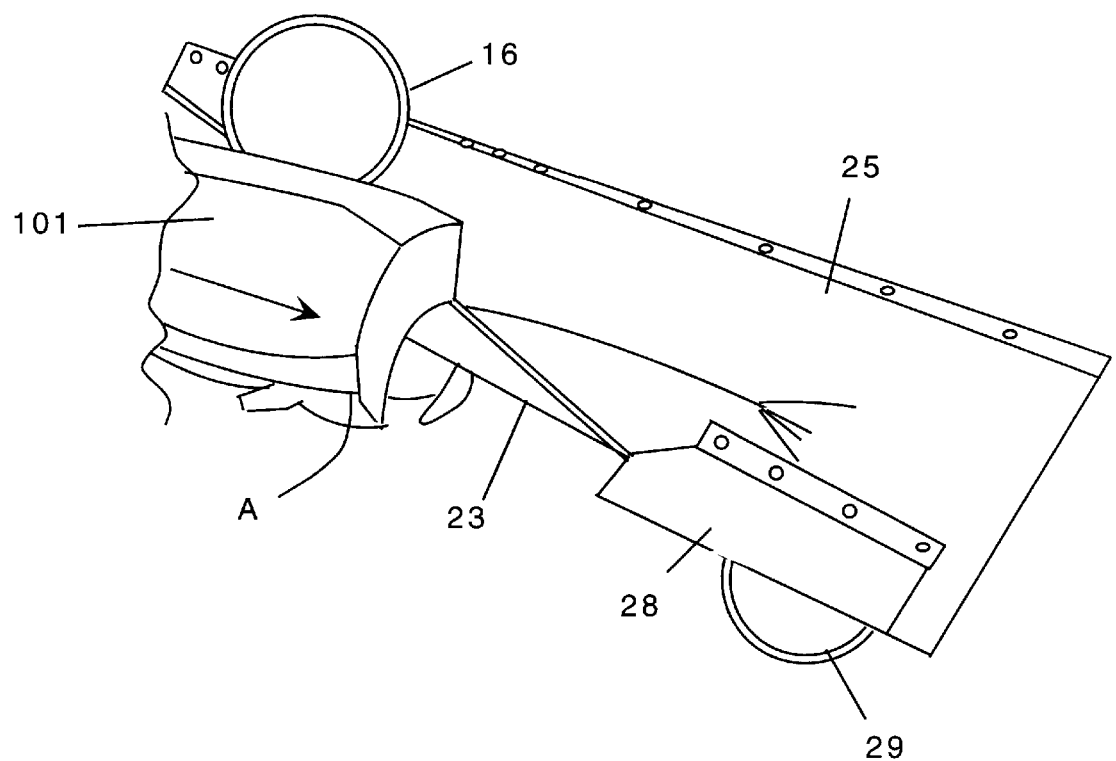
FIG. 9 is a perspective detail view of a fish entering the fillet knives of the first embodiment.
Figure 10:
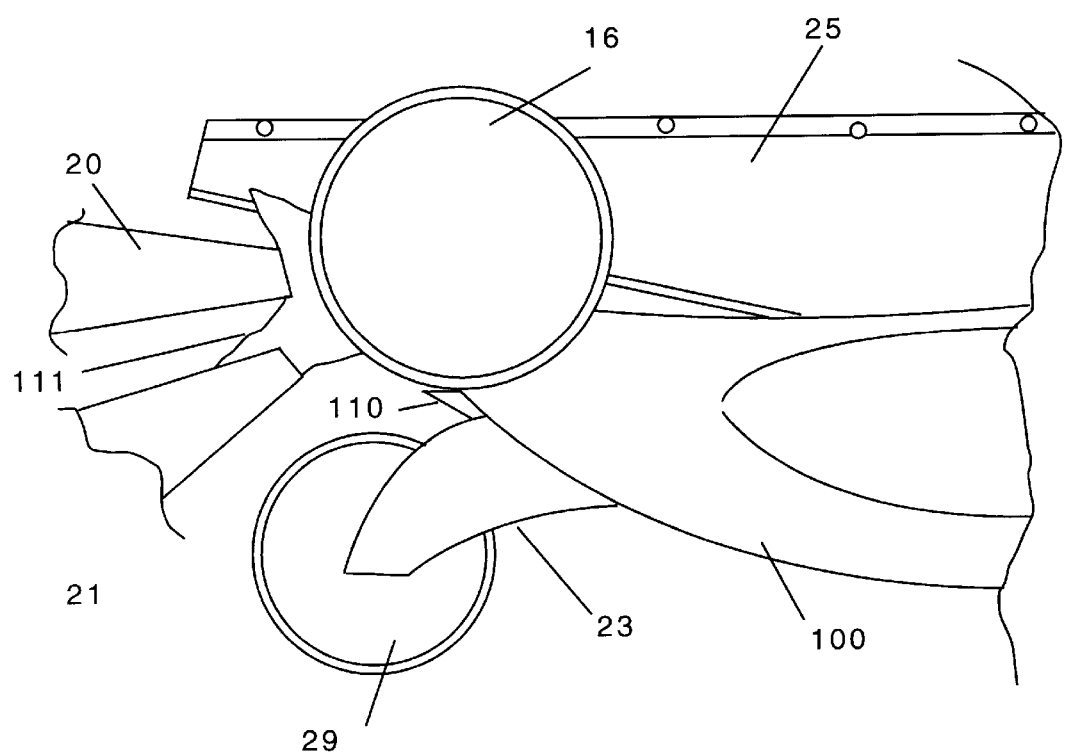
FIG. 10 is a side detail view of fish near the end of the filleting process of the first embodiment.

Referring now to FIG. 9, the ribcage guide 23 holds the fish 100 vertically, as the rotating knives 16 (note there is one knife for each wheel) cut on either side of the upper backbone. See FIG. 8. A long blade 25 then slices the meat from the backbone and rib cage as the fish 100 is pulled along. As the wheels 2 and 3 continue to rotate, they begin to move apart, which encourages the meat to separate from the bones. As shown in FIGS. 8 and 10, a single rotating knife 29 begins to cut from the end of the gut cavity, opening rearward until the gut cavity opening contacts the sloping rib cage guide 23 and the tail section 111 is forced upward (see FIG. 10). This movement allows the rotating blades 16 and 29 to cut both above and below the vertebrae until the fillet cut is complete. This upward motion is possible because the tail section 111 is too narrow to adhere to the refrigerated wheels 2 and 3.

Figure 11:
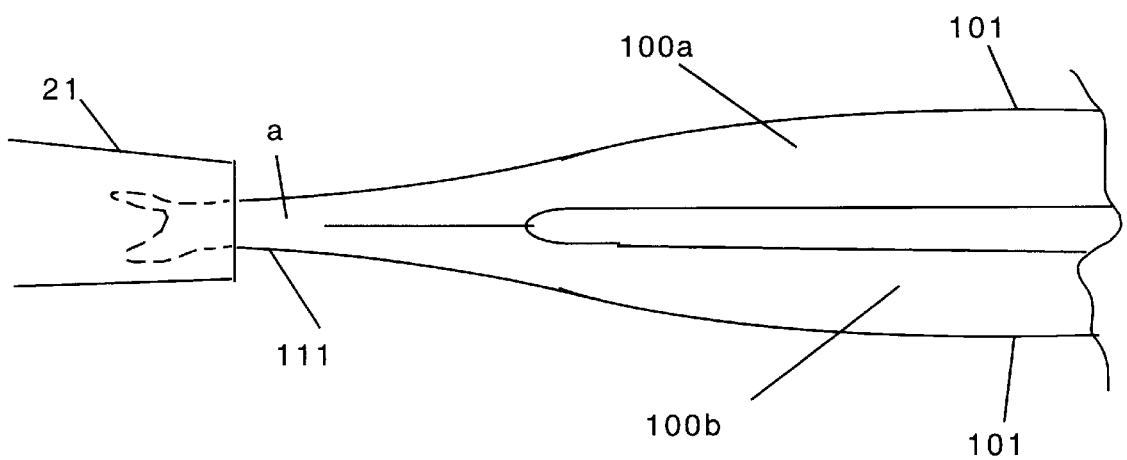
FIG. 11 is a bottom detail view of fish near the end of the filleting process of the first embodiment.

As shown in FIG. 11, the single cut from the gut cavity rearward and the two cuts from above do not intersect. This leaves a small uncut area a that serves to pull the carcass through the stationary knives 25 until the carcass 120 falls away on its own into a carcass chute 27 (see, e.g., FIG. 26). While this is going one, the fillets 100a and 100b continue to be separated from the bone structure by the stationary knives 25 as the fillets 100a and 100b are pulled along on the wheels 2 and 3.

FIG. 9 shows the lower belly meat portions being cut away, along the line of cut "A". The figure shows the pectoral fin and other portions too thick to pass between the rib cage guide 23 and the stationary knives 25, being forced by the belly meat guide 28 into the belly meat rotating knife 29.

As discussed above, the method just described is the preferred embodiment. That embodiment introduces a headed and gutted fish into the machine for processing.

The second embodiment uses a different set of cutting knives and begins with a whole fish (i.e., head and guts intact).

Figure 12:
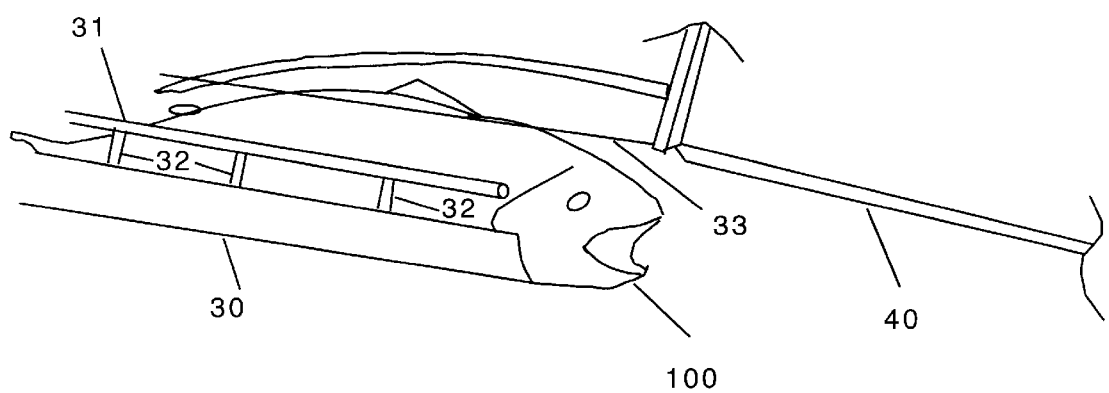
FIG. 12 is a detail view of fish entering the system of the second embodiment.
Figure 13:
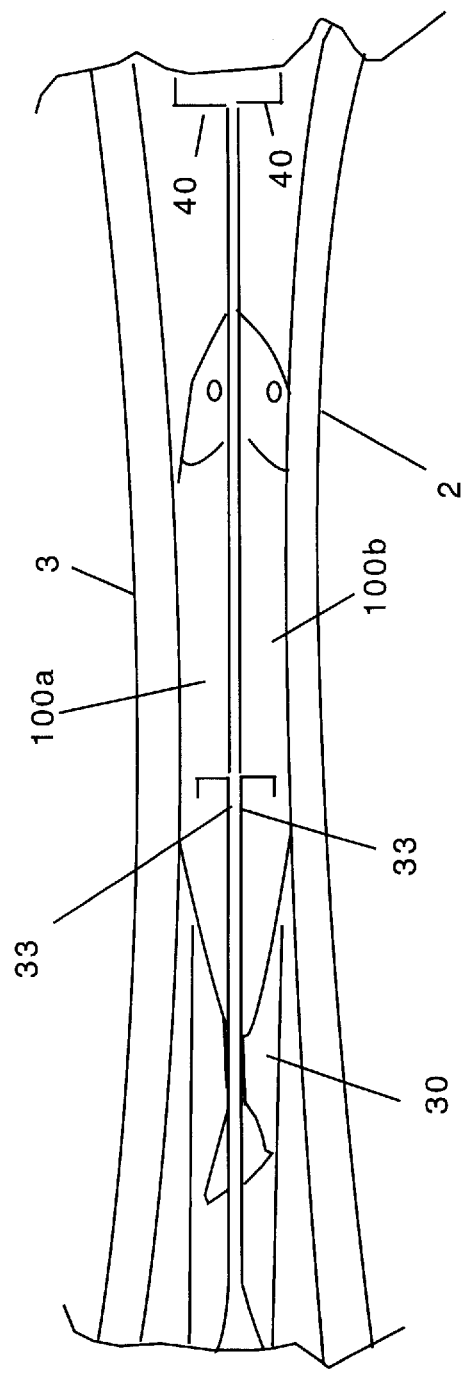
FIG. 13 is a detail view of fish approximately half way through the filleting process of the second embodiment.

Referring now to FIGS. 12 and 13, the fish 100 is introduced into the machine by means of a sling. It is important to keep the fish upright so that the backbone is centered as it enters the device. When the backbone is centered, there is minimum waste when the fillets are removed. As shown in the figure, the fish is slid into the machine on its belly, which rests in a trough 30. The trough is rounded on the bottom to better accommodate the fish. A rail 31 is used to support the fish in the trough 30. The rail 31 is supported by a number of springs 32. As the fish approaches the fillet knives 40, guides 33 center the dorsal fin as the fish approaches the fillet knives 40.

Figure 15:
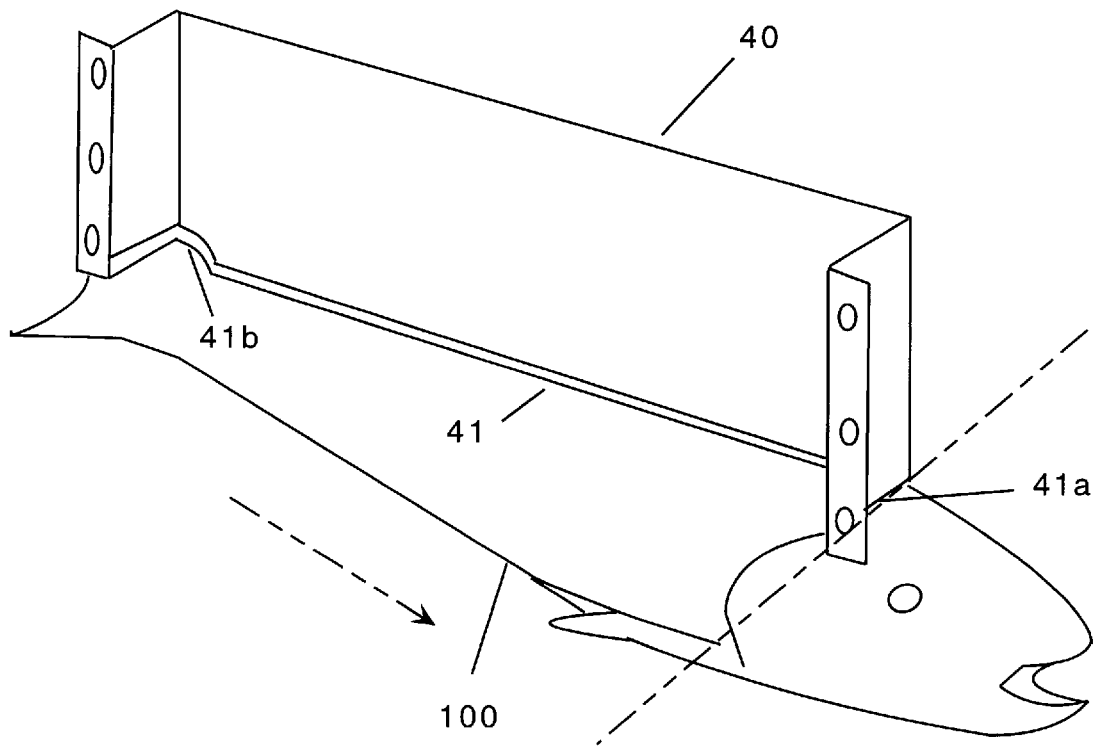
FIG. 15 is a detail view of the action of one fillet knife of the second embodiment on a fish.

Referring now to FIG. 15, the action of the fillet knives 40, moving down and out, tends to follow the natural curves of the bone structure of a fish 100, and of the wheels 2 and 3. For example, for salmon, the fillet cut is down to the backbone then down and out, following the shape of the rib cage. The shape of the leading edge 41a of the fillet knives 40 is important. Details are shown in FIGS. 16–18 and 23.

Figure 26:
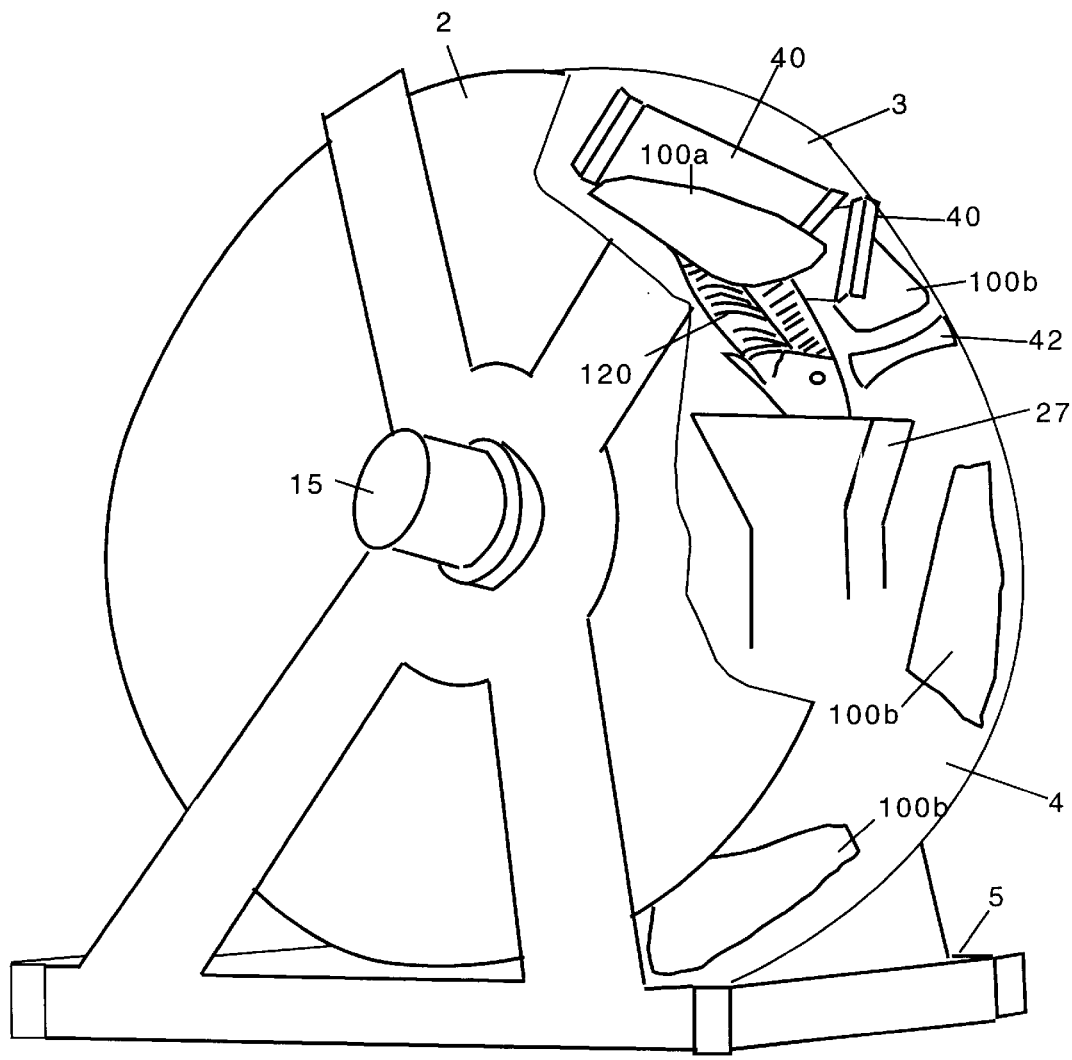
FIG. 26 is a perspective view of a filleted carcass falling into a disposal chute.

As shown in FIG. 26, the fillets 100a and 100b leave the knives 40, press wheels 42 (one for each wheel) push the outer edges of the fillet onto the refrigerated wheel 2 or 3 to adhere as much of the skin 101 as possible onto the refrigerated surface 4 of the wheels 2 and 3.

In FIG. 13, the fish is shown approximately one—half under the fillet knives 40. This figure shows the knives 40 cutting along the upper edge of either side of the backbone. The knives 40 have not yet begun to descend into the fish body. This occurs only after the fish head aligns with the forward edge of the knives.

Figure 14:
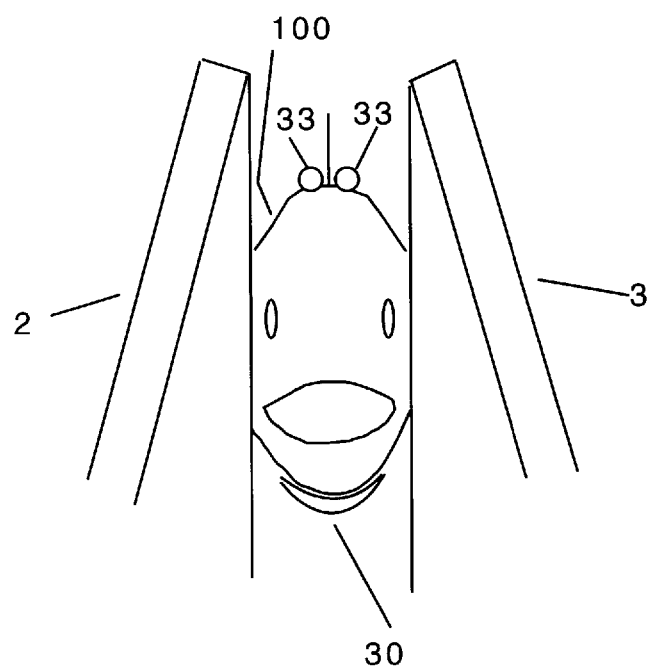
FIG. 14 is a front view of a fish entering the wheels for the process of the second embodiment.

FIG. 14 is a front view of the movement. Here, the fish is shown entering the device. The centering guides 33 are shown resting against the dorsal fin. The guides 33 float so they can follow the contours of the fish body as it moved through the device. However, the guides 33 are spring loaded to ensure that the rails remain tight against the backbone of the fish.

FIG. 15 is a detail of a fillet knife 40 (there are two knives positioned on either side of the fish) at the point where the knife 40 begins to descend. At this point, the knife 40 has already sliced into the back meat as the path of the fish is moving forward on the refrigerated wheels. Note that the knives 40 are fixed to the frame 5 of the device and only descend and ascend as the process goes forward.

Because the fish is moving forward on the wheels and the knives 40 are fixed to the frame 5, the cut of both the leading edge 41a and the trailing edge 41b of the knives 40 angles back from the top of the fillet. This lets the knives 40 follow the upper edge of the gill plate at the head of the fish. The resulting path of cut is shown as the dotted line in FIG. 15.

Figure 16:
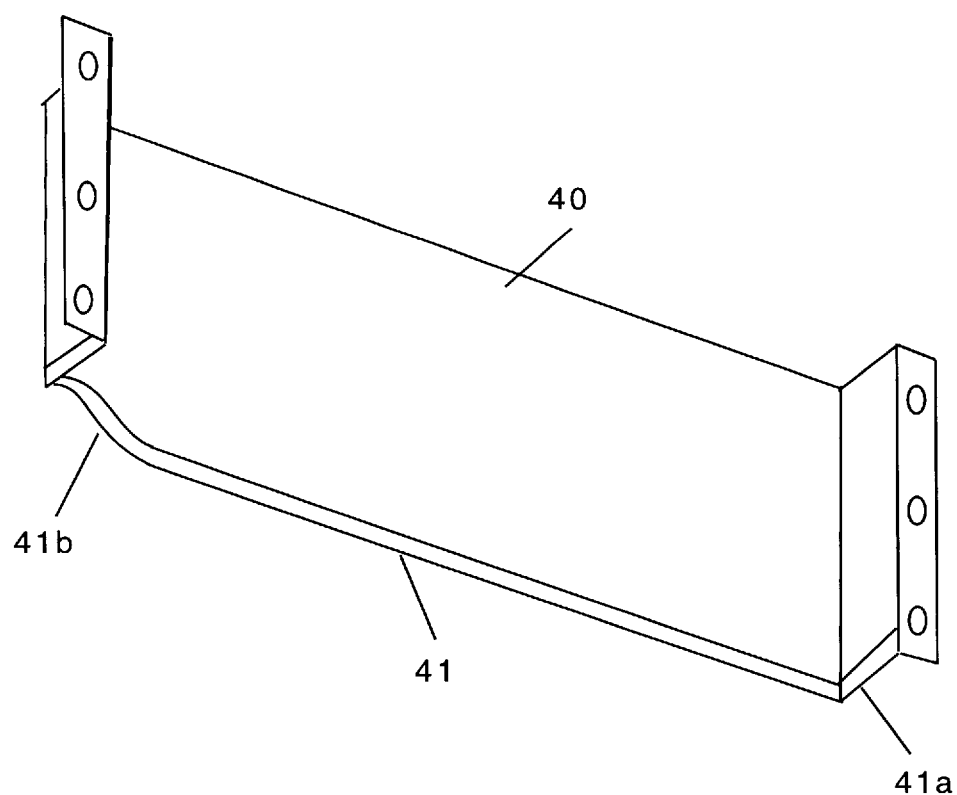
FIG. 16 is a perspective view of a second type of filleting knife.

FIG. 16 shows the fillet knife 40 from a different angle. In this view, the leading edge 41a of the knife is more clearly shown in this view. The cutting edge 41 is also clearly shown.

Figure 17:
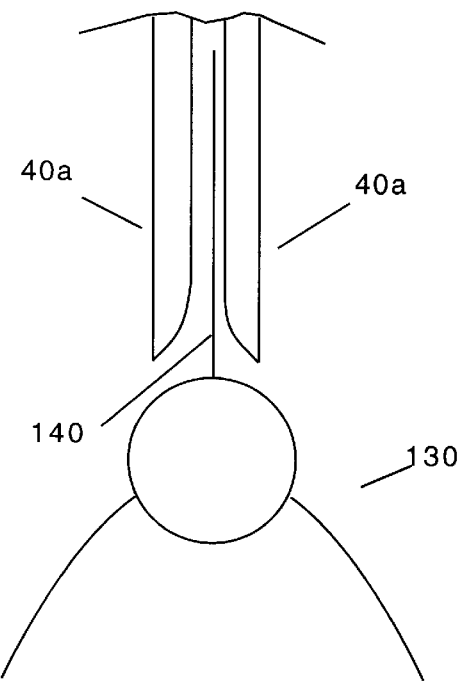
FIG. 17 is an enlarged detail view of one form of knives for the second embodiment.
Figure 18:
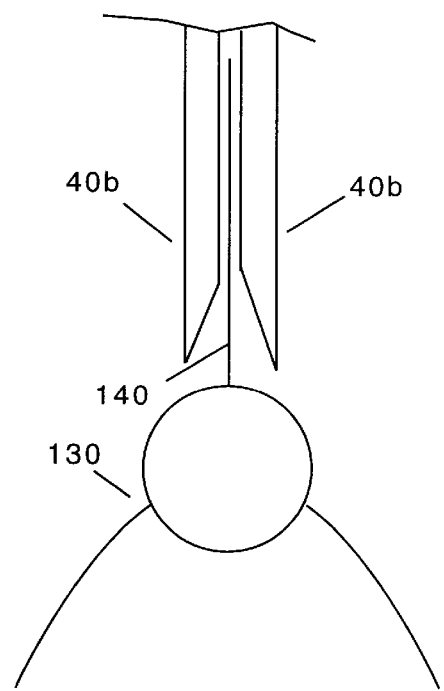
FIG. 18 is an enlarged detail view of a second form of knives for the second embodiment.

FIGS. 17 and 18 show an exaggerated cross section of the knife blades 40 in relation to a fish's back. The cross sections also show two ways that the blade can be sharpened. The rounded blade 40a shown in FIG. 17 is preferred because it rides down the rib cage as the knife descends. The blade 40b of FIG. 18 has a tendency to cut into the rib cage 130 more than that FIG. 17.

Figure 19:
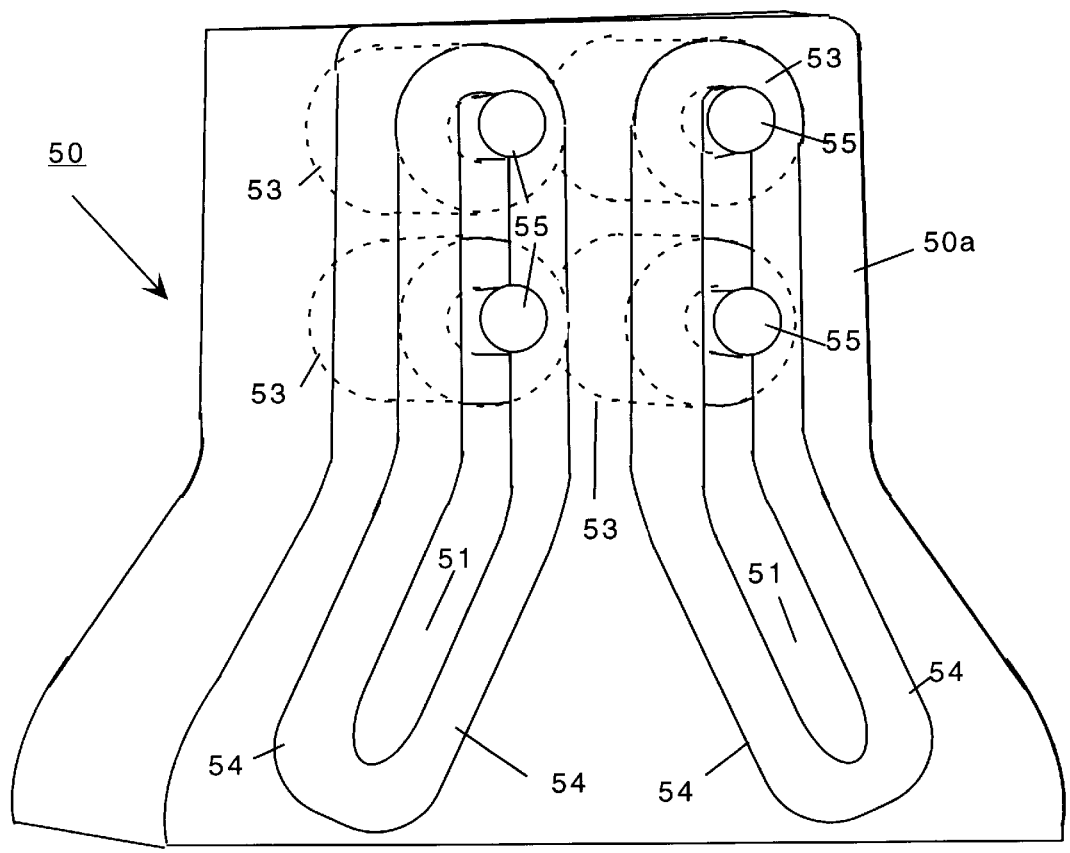
FIG. 19 is a perspective cut-away view of the knife housing of the second embodiment.
Figure 20:
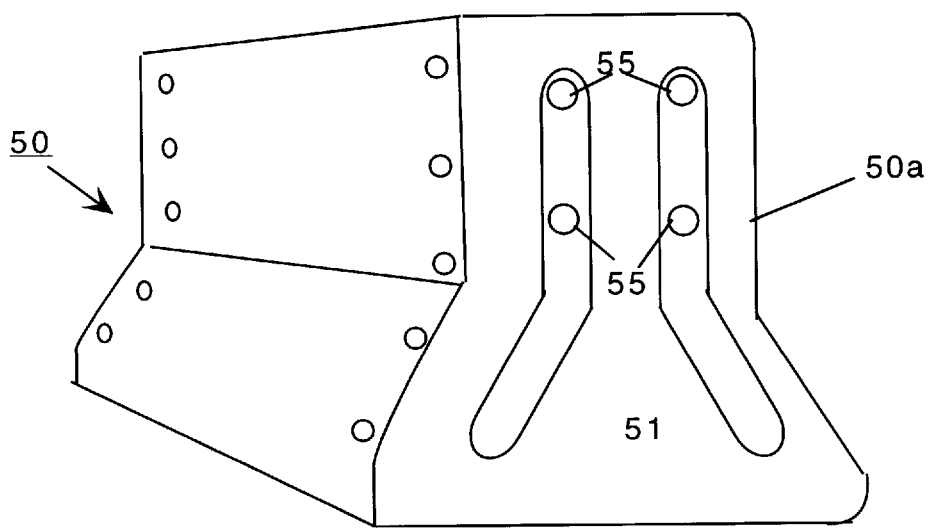
FIG. 20 is a front perspective view of the knife housing of the second embodiment.
Figure 21:
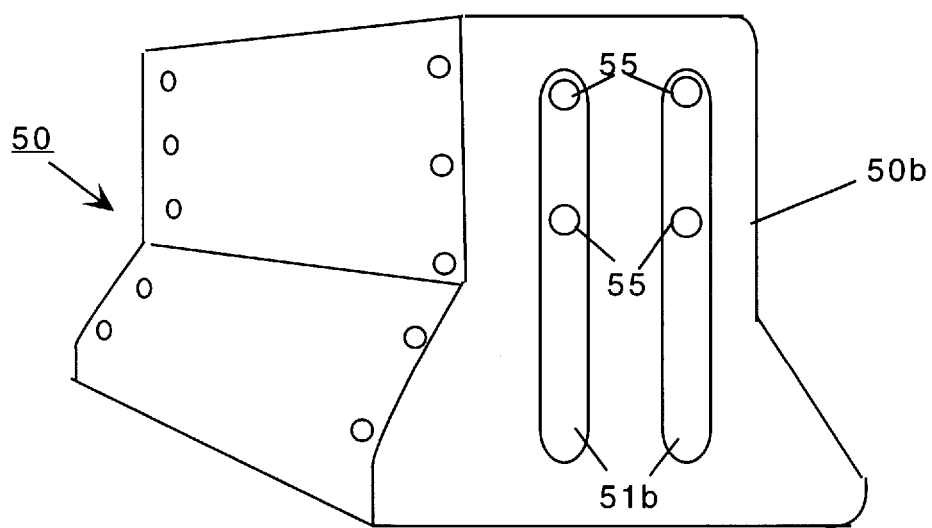
FIG. 21 is a rear perspective view of the knife housing of the second embodiment.

Referring now to FIGS. 19 and 20 and 21, the knives 40 are housed in a knife guide housing 50, which is secured to the frame 5. The housing 50 is shown in FIGS. 20 and 21. FIG. 20 shows the front guide 50a of the knife guide housing 50, that holds the leading edge 41a of the knives. A pair of axle tracks 51 is shown (FIG. 19). Note that for the leading edge 41a, the tracks 51 are curved away from center at their lower ends. FIG. 21 shows the back 50b of the knife guide housing 50. Here, the trailing edge 41b guide is shown. Note that the axle tracks 51a for the trailing edge are nearly vertical.

FIG. 19 is a partial cutaway view of the knife guide housing 50, showing the guide end plate 50a for the leading edge 41a. For each blade, there are a pair of guide bearings 53, as shown. The bearings 53 ride in tracks 54 as shown. For each bearing, there is an axle 55. The axles 55 are attached to the fillet knives 40 with the knife blade brackets 52 (see FIG. 22). FIG. 19 also shows the axle tracks 51 on this end of the housing 50 track the basic shape of a fish's rib cage 130. As shown, the axle guides 51 pull the bearings 53 and knife blades 40 down and out, following the contours of the fish's body.

As shown in FIGS. 20 and 21, the leading edges 41a of the knives 40 move down and out, while the trailing edges 41b of the blades 40 move down vertically. Accordingly, the fillet knives 40 must be flexible enough to bend or warp.

Figure 22:
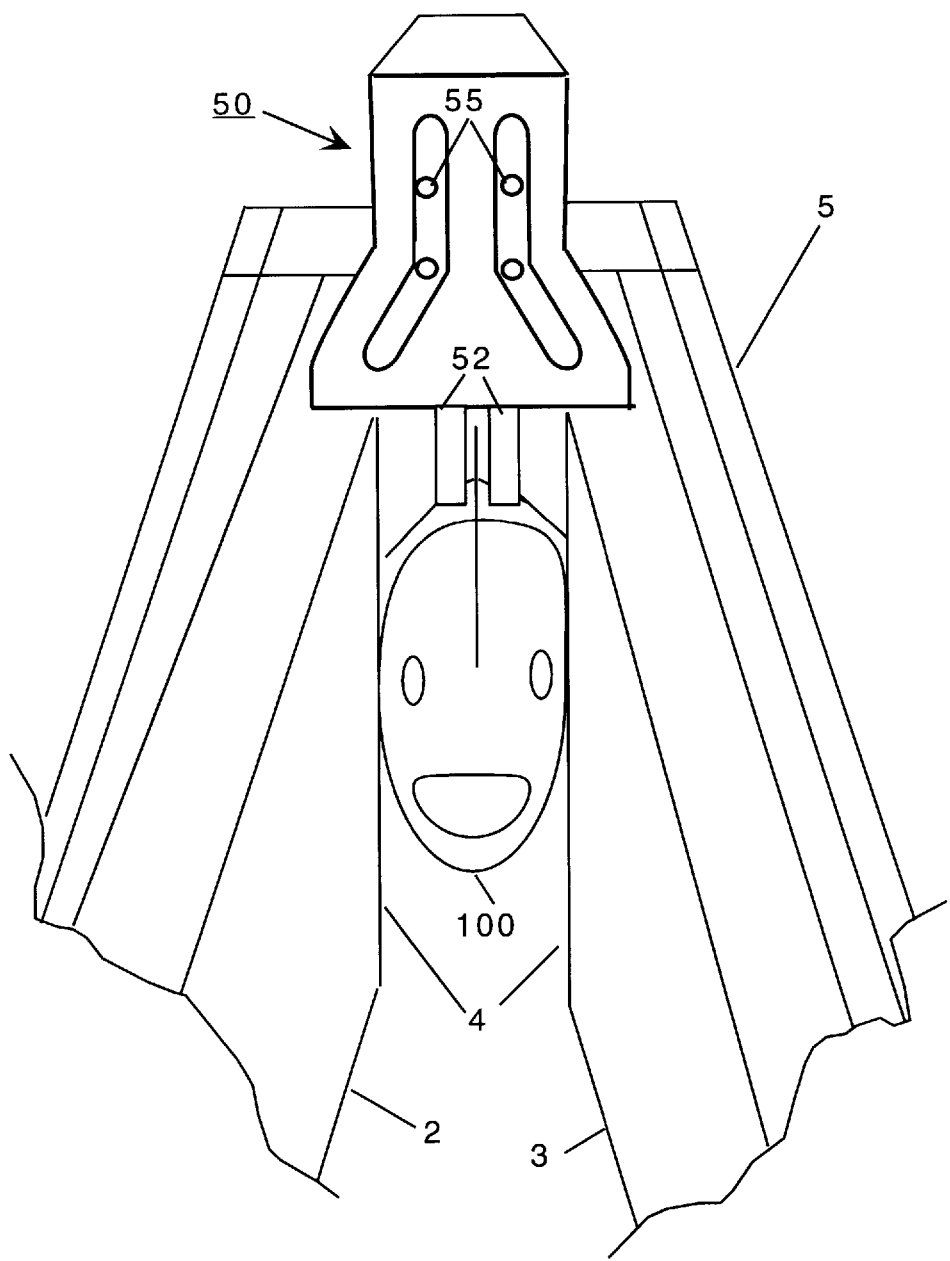
FIG. 22 is a detail view of the fish entrance at the top of the wheels, showing the filleting knives and the fillet knife housing.

FIG. 22 shows the placement of the knife guide 50 on the framework. In this view, two knife supports 52 are shown descending from the guide 50. The fillet knives 40 are attached to these knife supports 52.

Figure 23:
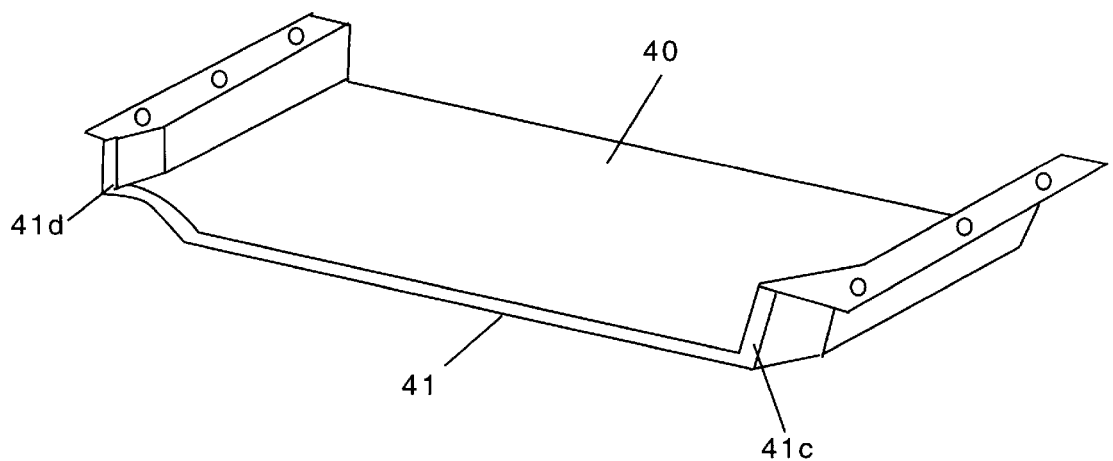
FIG. 23 is a detail of another type of fillet knife for the second embodiment.

FIG. 23 shows an alternative design of the fillet knife 40. In this view, the leading edge 41c and trailing edge 41d have been modified to angle the bottom corners more toward the tail of the fish. This angle is used to better cut the fillets from the carcass 120 because of the forward movement of the fish 100 into the knives 40.

Figure 24:
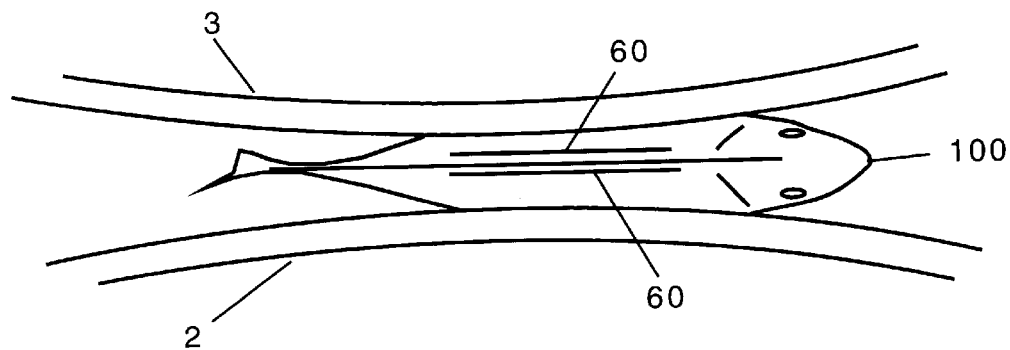
FIG. 24 is a top detail view of a fish, attached to the wheels at the beginning of the filleting process of the second embodiment.
Figure 25:
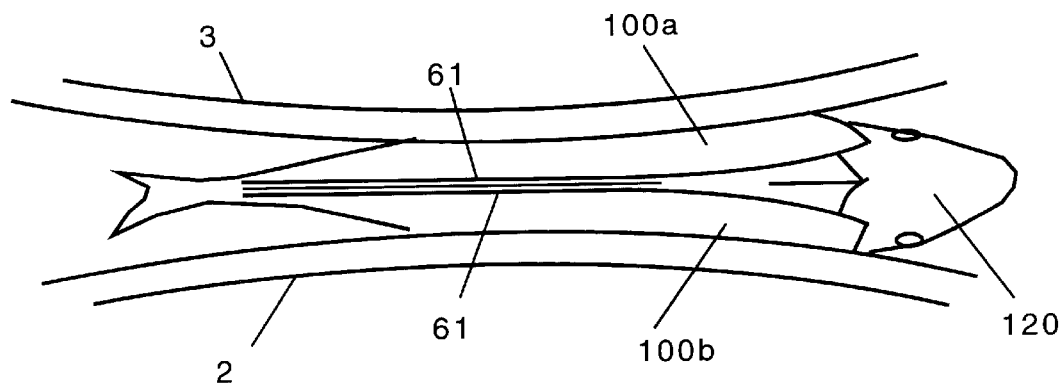
FIG. 25 is a top detail view of a fish, attached to the wheels later in the filleting process of the second embodiment.

FIGS. 24 and 25 show the action of the knives 40 on the fish. The knives 40 are not shown for clarity. In FIG. 24, the lines 60 indicate the path of the cut before the decent of the knives 40. FIG. 25 shows the result of the cutting action as the lines 61 have extended back toward the tail. At this point, the fillet knives 40 have descended enough that the head and forward part of the carcass 120 have begun to fall away. The fillets 100a and 100b are shown adhering to the refrigerated wheels.

FIG. 26 is a perspective detail view of the fish fillets 100a and 100b and carcass 120 as the fish is being processed. Here, the fish has been filleted. The fillet knives 40 are being drawn upward. The fillets 100a and 100b have adhered to the wheels 2 and 3 and move forward and downward to the next processing step. The roller 42 is the press roller, as mentioned above. A roller 42 is placed on both wheels. The rollers 42 lightly press each fillet to the wheel to insure the complete adhesion of the fillet. The carcass 120 is shown falling into the chute 27, where it can be processed further as desired.

Figure 27:
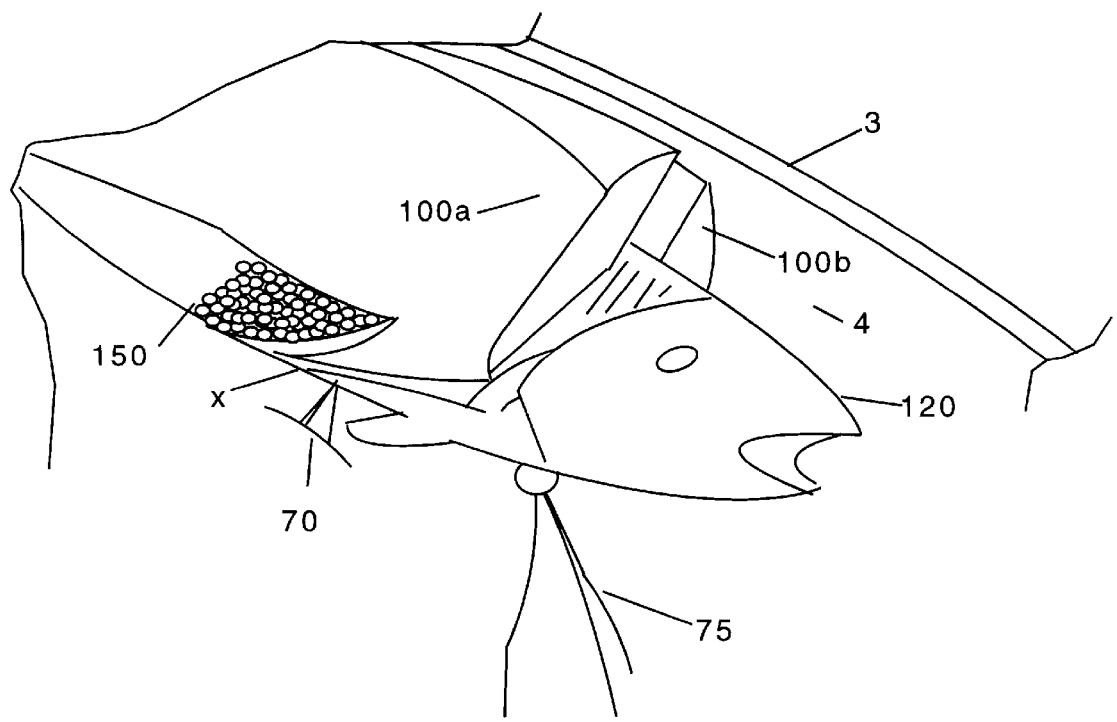
FIG. 27 is a detail view of a fish undergoing roe removal in the second embodiment.
Figure 28:
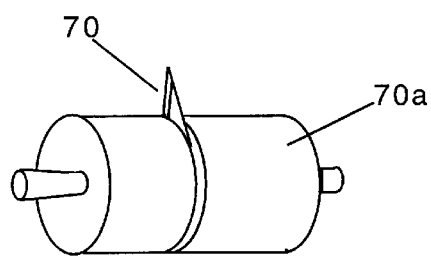
FIG. 28 is a perspective detail view of a gut blade of the second embodiment.
Figure 29:
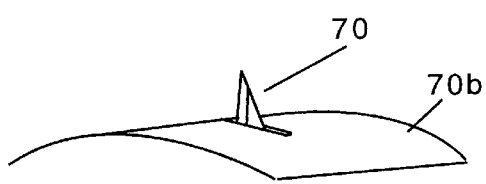
FIG. 29 is a perspective detail view of a second gut blade of the second embodiment.

FIG. 27 shows the fillets 100a and 100b being cut away from above while a belly knife 70 cuts open the belly for entrails removal and, where desired, roe removal. Typical belly knives 70a and 70b are shown in FIGS. 28 and 29. As shown, the belly knife 70 has a sharp point. It also must have some type of means to limit the depth of cut. In FIGS. 22 and 23, this means is the length of the blade and the bottom plate that prevents further knife penetration. The belly knife 70a of FIG. 28 uses a roller for depth control. The knife 70b of FIG. 29 uses a slide depth control.

Figure 30:
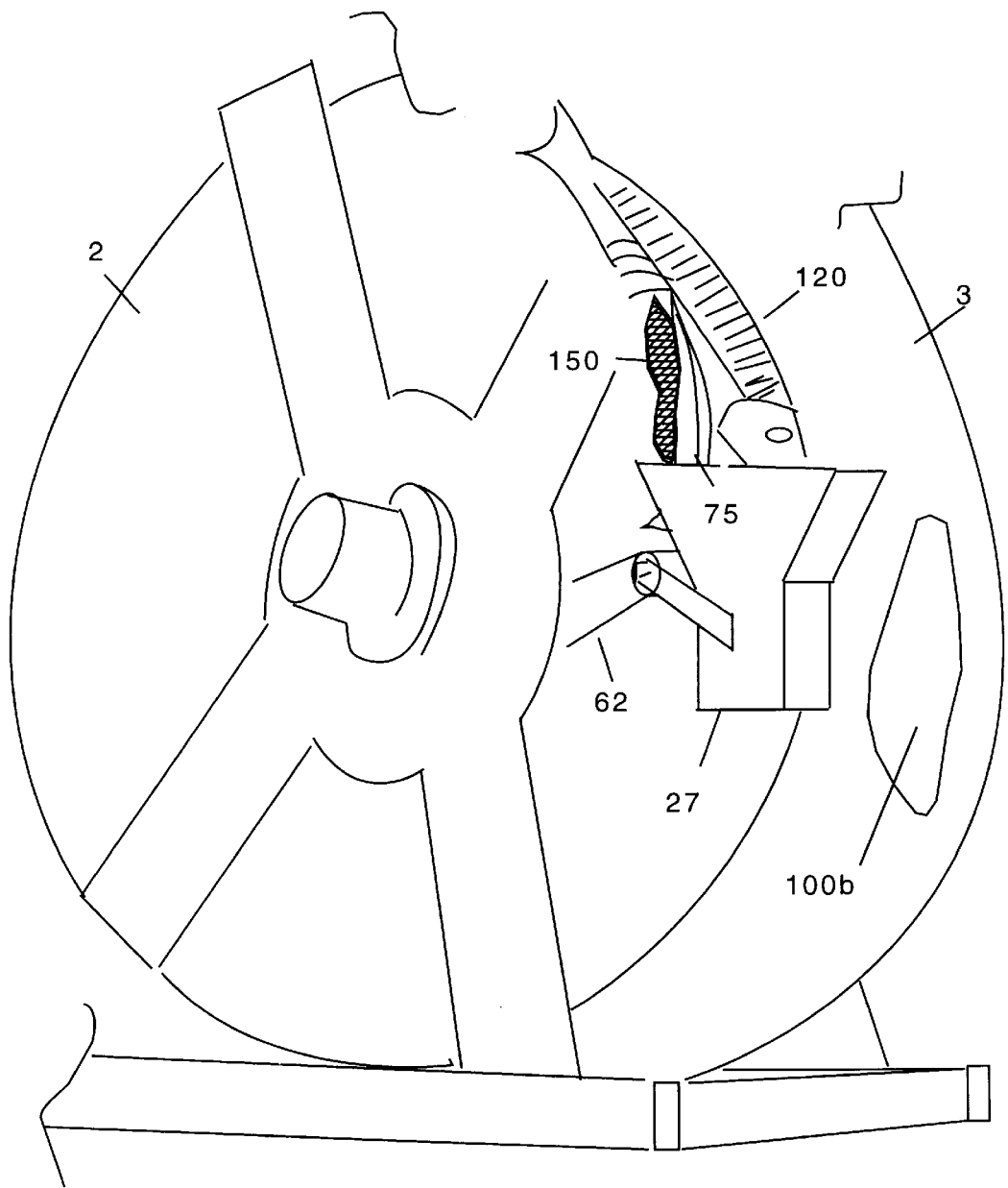
FIG. 30 is a perspective detail of a carcass being disposed of with roe removal as part of the second embodiment.

FIG. 27 shows that the belly knife 70 is between the fillet knives 40. In this figure, the fillet knife 40 has cut the fillet away from the carcass 120 to point x as shown. Two roe sacs 150 are shown. As the fillet knives 40 cut the fillets, the carcass 120 is moving forward. As the carcass 120 begins to drop down, a flexible entrails scoop 75 enters the gut cavity to scoop the entrails and the roe. The carcass 120 falls into a chute 27 as shown in FIG. 30. The roe 150 is shown falling separately onto a conveyer 62 for further processing.

Figure 31:
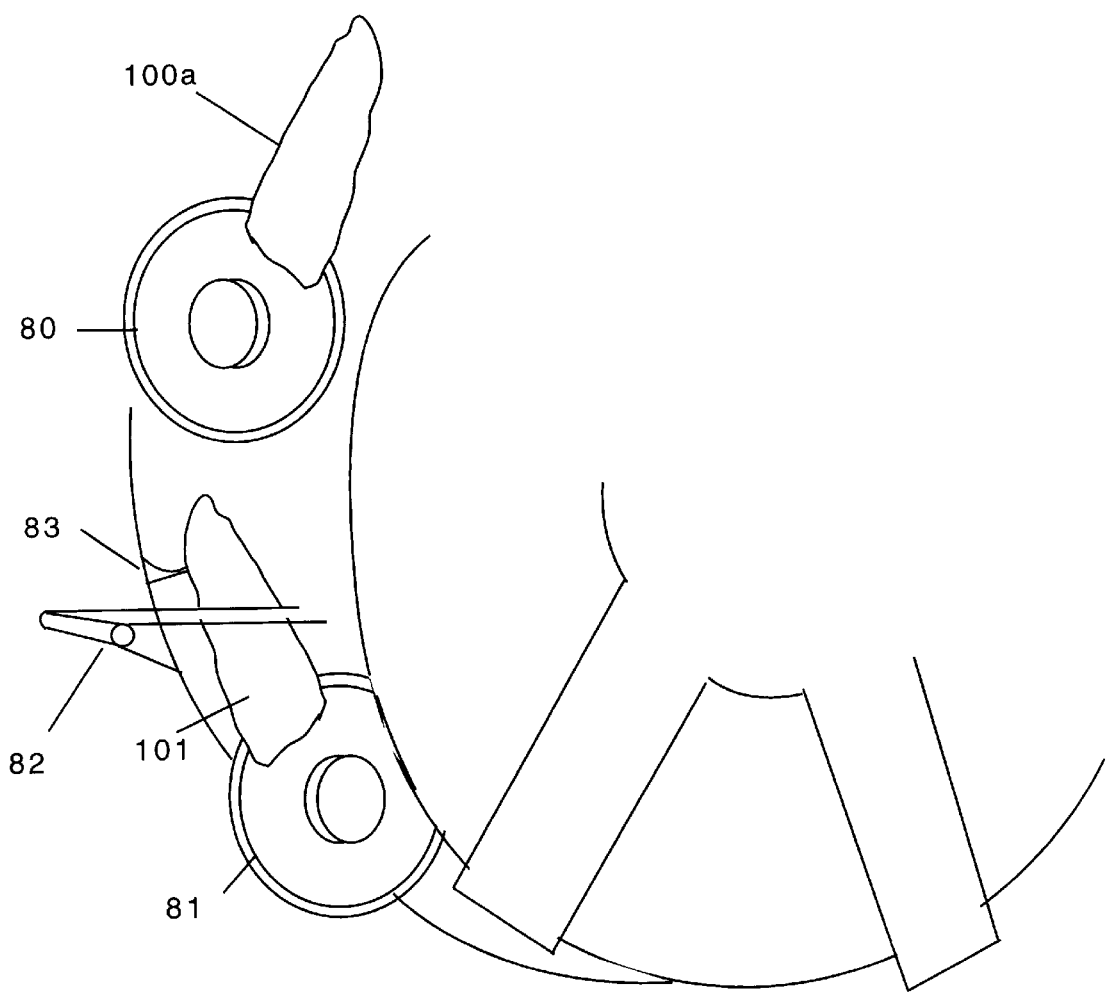
FIG. 31 is a detail of the fillet remover blade and the skin remover blades, removing the fillet and skin from the wheel.

For either embodiment of fillet knives, once the fillets 100a and 100b and skin 101 are stuck on the wheels, they must be removed. FIG. 31 illustrates one method for cleaning the wheels. The skin 101 and meat 100a and 100b continue to move along the wheels to the next station, where the meat is removed by a rotating blade 80. The rotating blade 80 is adjusted to the desired clearance from its corresponding wheel, either 2 or 3, so the fillet meat is cut from the skin 101. The skin 101, still adhering to the wheels 2 or 3, passes between the blade 80 and the wheel 2 or 3. The fillet meat 100*a* or 100*b* falls onto the conveyor 82 for further processing. The skin 101 is then removed by another rotating blade 81, which is adjusted to just clear the wheels 2 or 3. This blade 81 also clears off as much frost from the wheels 2 and 3 as possible. Clearing the frost from the wheels 2 and 3, provides the best adhesion to the wheels 2 and 3. The skin 101 and frost slide into chute 83 for disposal. Chute 83 can be tied to chute 27 if desired.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A fish processing device for removing fillets from a fish having a top, a bottom, and a carcass, comprising:
   a) a frame;
   b) a pair of rotating wheels, each wheel having a frost susceptible rim, rotatably attached to said frame, said pair of rotating wheels being articulated so that the pair of wheels is spaced close together at one point of rotation, and are spaced farther apart at a later point of rotation;
   c) means for refrigerating said frost susceptible rim of each wheel;
   d) a means for introducing a fish into said pair of wheels, whereby said fish becomes attached to said pair of wheels by frost adhesion;
   e) a means for cutting a pair of side fillets from said fish; such that as said pair of fillets are cut from said fish, said pair of fillets are adhered to said pair of wheels and are removed from the fish; and
   f) a means for rotating said pair of rotating wheels.

2. The fish processing device of claim 1 wherein the means for refrigerating said frost susceptible rim of each wheel includes:
   a) a means for chilling a refrigerant liquid; and
   b) a means for introducing said refrigerant liquid into said frost susceptible rim or each wheel.

3. The fish processing device of claim 1 wherein the means for introducing a fish into said pair of wheels includes:
   a) an upper guide for supporting the top of said fish; and
   b) a lower guide for supporting the bottom of said fish.

4. The fish processing device of claim 1 wherein the means for introducing a fish into said pair of wheels includes: a sling, slidably placed under said fish to support the bottom of said fish.

5. The fish processing device of claim 1 wherein the means for cutting a pair of side fillets from said fish include a pair of rotating knives, being operably attached to said frame.

6. The fish processing device of claim 1 wherein the means for cutting a pair of side fillets from said fish include a pair of knives having long blades.

7. The fish processing device of claim 1 wherein the means for rotating said pair of rotating wheels comprises a pair of drive motors, operably attached to a pair of axles, whereby said pair of axles are fixedly attached to said pair of wheels, and whereby said axles are rotatably attached to said frame.

8. A fish processing device for removing fillets from a fish having a top, a bottom, a backbone, a rib cage, and a carcass, comprising:
   a) a frame;
   b) a pair of rotating wheels, each wheel having a frost susceptible rim, rotatably attached to said frame, said pair of rotating wheels being articulated so that the pair of wheels is spaced close together at one point of rotation, and are spaced farther apart at a later point of rotation, such that as said fish is introduced to said pair of rotating wheels, said fish adheres to said frost susceptible rims of said pair of wheels, and further such that said fish is then carried by said pair of rotating wheels as said pair of rotating wheels move in a rotating motion;
   c) a means for chilling a refrigerant liquid;
   d) a means for introducing said refrigerant liquid into said frost susceptible rim or each wheel;
   e) an upper guide for supporting the top of said fish, being pivotably attached to said frame, and being placed adjacent to said pair of rotating wheels;
   f) a lower guide for supporting the bottom of said fish, being pivotably attached to said frame, and being placed adjacent to said pair of rotating wheels;
   g) a pair of rotating fillet knives in an operable position with respect to said pair of rotating wheels, such that said pair of rotating fillet knives engages said fish and cuts alongside said backbone of said fish, thereby removing said fillets from said fish as said fish moves with said pair of rotating wheels;
   h) a pair of axles, fixedly attached to said pair of wheels, and also being rotatably attached to said frame; and
   i) a pair of drive motors, operably attached to said pair of axles.

9. The fish processing machine of claim 8 further comprising:
   a) a single rotating knife, positioned below said pair of rotating knives to cut the bottom of said fish; and
   b) a fixed blade knife, fixedly attached to said frame and being positioned with respect to said pair of rotating wheels to cut the carcass completely from said fillets.

10. The fish processing machine of claim 8 further comprising a means for disposing of said carcass.

11. The fish processing machine of claim 8 further comprising a means for removing the fillets from said pair of rotating wheels.

12. The fish processing machine of claim 11 wherein the means for removing the fillets from said pair of rotating wheels comprises a pair of rotating knives, positioned with respect to said pair of rotating wheels to pass between said frost susceptible rims of said pair of rotating wheels and said fillets.

13. A fish processing device for removing fillets from a fish having a top, a bottom, a backbone, a rib cage, a roe sac, and a carcass, comprising:
   a) a frame;
   b) a pair of rotating wheels, each wheel having a frost susceptible rim, rotatably attached to said frame, said pair of rotating wheels being articulated so that the pair of wheels is spaced close together at one point of rotation, and are spaced farther apart at a later point of rotation, such that as said fish is introduced to said pair of rotating wheels, said fish adheres to said frost susceptible rims of said pair of wheels, and further such that said fish is then carried by said pair of rotating wheels as said pair of rotating wheels move in a rotating motion;

c) a means for chilling a refrigerant liquid;

d) a means for introducing said refrigerant liquid into said frost susceptible rim or each wheel;

e) a sling for supporting said fish;

f) a knife housing, fixedly attached to said frame and positioned above said pair of rotating wheels;

g) a pair of knives, operably positioned within said knife housing;

h) a means for causing said pair of knives to descend from said knife housing into said fish, whereby said pair of knives cuts into said fish and removes the fillets from said fish;

i) a pair of axles, fixedly attached to said pair of wheels, and also being rotatably attached to said frame; and j) a pair of drive motors, operably attached to said pair of axles.

14. The fish processing machine of claim 13 further comprising a means for disposing of said carcass.

15. The fish processing machine of claim 13 further comprising a means for removing the fillets from said pair of rotating wheels.

16. The fish processing machine of claim 15 wherein the means for removing the fillets from said pair of rotating wheels comprises a pair of rotating knives, positioned with respect to said pair of rotating wheels to pass between said frost susceptible rims of said pair of rotating wheels and said fillets.

17. The fish processing machine of claim 13 further comprising a means for extracting said roe sac from said fish, operably attached to said frame.

18. The fish processing machine of claim 17 wherein the means of extracting said roe sac includes a gut knife, operably attached to said frame such that said gut knife opens the bottom of said fish as said fish is moved on said pair of rotating wheels, thereby exposing said roe sac; and a means for scooping said roe sac from said fish.

19. The fish processing machine of claim 18 further comprising a means for collecting said roe sac after said roe sac is removed from said fish.

20. The fish processing machine of claim 19 wherein said means for collecting said roe sac comprises a conveyor belt.

* * * * *